United States Patent
Plebuch

(10) Patent No.: US 10,245,669 B2
(45) Date of Patent: Apr. 2, 2019

(54) DEVICE AND METHOD FOR AUTOGENOUS PROCESSES

(71) Applicant: Franz-Clemens Plebuch, Amberg (DE)

(72) Inventor: Franz-Clemens Plebuch, Amberg (DE)

(73) Assignee: Linde Aktiengesellschaft, Munich (DE)

(*) Notice: Subject to any disclaimer, the term of this patent is extended or adjusted under 35 U.S.C. 154(b) by 689 days.

(21) Appl. No.: 14/281,060

(22) Filed: May 19, 2014

(65) Prior Publication Data

US 2014/0255859 A1 Sep. 11, 2014

Related U.S. Application Data

(63) Continuation-in-part of application No. 12/528,004, filed on Jan. 14, 2010, now abandoned.

(51) Int. Cl.
*F23J 7/00* (2006.01)
*B23K 7/08* (2006.01)
*B23K 5/00* (2006.01)

(52) U.S. Cl.
CPC ............ *B23K 7/08* (2013.01); *B23K 5/003* (2013.01)

(58) Field of Classification Search
USPC ............................................ 431/4, 181, 187
See application file for complete search history.

(56) References Cited

U.S. PATENT DOCUMENTS

| | | | | |
|---|---|---|---|---|
| 6,079,225 A | * | 6/2000 | Ruppert | C03B 19/1423 65/17.2 |
| 2009/0233000 A1 | * | 9/2009 | Wang | C23C 16/403 427/447 |

* cited by examiner

*Primary Examiner* — Vivek K Shirsat
(74) *Attorney, Agent, or Firm* — Philip H. Von Neida

(57) ABSTRACT

In order to improve an enveloping gas device for transporting at least one enveloping gas that is allocated to at least one burner head or at least one nozzle of a device for working or processing at least one component or workpiece by autogenous processes, so that a reduction of the contaminant concentration, particularly the concentration of nitrogen oxides ($NO_x$) and other harmful compounds is achieved, it is suggested, a flame issuing from the burner head or nozzle and directed towards the component or workpiece is completely enclosed by the enveloping gas, and the concentration of contaminants contained in the waste gas from the device, particularly the concentration of nitrogen oxides ($NO_x$), is reduced by the enveloping gas. The present invention further relates to a corresponding method associated with the enveloping gas device for working or processing at least one component or workpiece with autogenous processes.

7 Claims, 2 Drawing Sheets

DEVICE AND METHOD FOR AUTOGENOUS PROCESSES

CROSS REFERENCE TO RELATED APPLICATIONS

This application claims priority from U.S. Ser. No. 12/528,004, filed Jan. 14, 2010 which claims priority under 35 USC § 119 to International Patent Application No PCT/EP2008/001810 filed in the European Patent Office on Mar. 6, 2008, which claims priority from European Patent Application 07012516.6 filed Jun. 26, 2007, which claims priority from German Patent Application DE 102007012083.6 filed Mar. 13, 2007 and from German Patent Application DE 102007012082.8 filed Mar. 13, 2007.

BACKGROUND OF THE INVENTION

The present invention relates to the technical area of working or processing components or workpieces by autogenous processes.

In the technical area of oxyfuel technology, time-honored processes that can be performed manually or automated mechanically for working or processing components or workpieces include various flame processes such as flame gouging, brazing, straightening, cutting, or flame heating.

In such cases, the flame used is a flame that is generated from a fuel gas or fuel gas mixture and an oxidant. The gases acetylene, ethene, methane, methylacetylene or propene, or gas mixtures thereof are used as the fuel gas. However other fuels may also be used instead of those listed, which are commercially available and important in the processing industry. Of all the fuel gases, acetylene has the highest flame temperature. Oxygen or even air is used as the oxidant.

Autogenous processes are processes in which materials are worked using a flame. For example, flame straightening is used to correct changes in shape that occur during the process of manufacturing components or workpieces. As may be learned from the "Handbuch der Flammrichttechnik" (Flame straightening technology manual), Welding Technology reference book series, volume 124, DVS-Verlag, Dusseldorf 1995, or the pamphlet "Tippy fur Praktiker. Flammrichten" (Tips for operators. Flame straightening) (June 2005 edition) published by Linde, in flame straightening, the component or workpiece is heated. In this way, undesired changes in shape are corrected.

Autogenous flame cutting is a type of thermal cutting process. The term flame heating refers to a process in which components are heated locally to enable forming. Flame brazing is a joining process in which a joint is created using solder. Flame gouging is a process for eliminating incorrect weld seams.

With regard to the equipment used in autogenous processes, different burners are used depending on the application in question or the thickness of the component or workpiece (see FIG. 1), such as single flame or single nozzle burners, or flame burners in which several individual flames issuing from the burner head form one common flame, or multiple nozzle burners, in which one flame each issues from several nozzles, or also special burners.

U.S. Pat. No. 2,286,591 discloses a method for working or processing at least one component or workpiece by autogenous processes and should also be mentioned in the review of the related art. Applications GB 539 470; U.S. Ser. No. 349,902; and U.S. Pat. No. 4,035,604 are also of some significance with respect to the technological background of the present invention.

In the manually or mechanically performed oxyfuel technology processes described above, in which open flames are used, particularly open fuel-oxygen flames or open fuel-air flames, it seems desirable to reduce the concentration of contaminants contained in the waste gas from the burner, particularly the concentration of nitrogen oxides ($NO_x$), for example poisonous nitric oxide (NO) and/or nitrogen dioxide ($NO_2$), and of other harmful compounds, not least in order to comply with toxic substance limit values, and thus also to minimize pollutant emissions and environmental damage, and thereby to limit to the extent possible any possible threat to the health of the burner operator.

SUMMARY OF THE INVENTION

With due appreciation for the prior art as described and proceeding from the disadvantages and deficiencies of the prior art defined in the preceding, the object of the present invention is to improve a device for working or processing at least one component or workpiece by oxyfuel technology and a method for working or processing at least one component or workpiece by oxyfuel technology in such manner that a reduction in the concentration of contaminants, particularly the concentration of nitrogen oxides ($NO_x$) and other polluting compounds is achieved.

This object is solved with an enveloping gas device for transporting at least one enveloping gas, wherein the enveloping gas device is allocated to a burner head or at least one nozzle of a device provided for working or processing at least one component or workpiece by autogenous processes, characterized in that at least one flame issuing from the burner head or nozzle and directed towards the component or workpiece is enclosed by the enveloping gas, and the concentration of contaminants contained in the waste gas from the device, particularly the concentration of nitrogen oxides ($NO_x$), reduced by the enveloping gas; with a device having at least one burner head or nozzle, provided for working or processing at least one component or workpiece with autogenous processes, characterized by at least one enveloping gas device; and with a method for working or processing at least one component or workpiece using autogenous processes, characterized in that at least one flame issue from the burner head or nozzle in the direction of the component or workpiece is enclosed by at least one enveloping gas, and that the concentration of nitrogen oxides ($NO_x$) is reduced by the enveloping gas. Advantageous embodiments and practical developments of the present invention are described in the respective subordinate claims.

Consequently, the present invention is based on the provision of an enveloping gas device for completely enclosing the flame of the autogenous process. The method according to the invention thus provides that the flame of the autogenous process is completely surrounded by an enveloping gas.

In one embodiment there is disclosed an enveloping gas device for transporting at least one enveloping gas, wherein the enveloping gas device is allocated to a burner head or at least one nozzle of a device provided for working or processing at least one component or workpiece by autogenous processes, characterized in that at least one burner flame issuing from the burner head or nozzle and directed towards the component or workpiece is completely enclosed by the enveloping gas which is not consumed by the at least one burner flame, and concentrating the flame on the at least one component or workpiece and the concentration of contaminants contained in the waste gas from the device is reduced by the enveloping gas.

In a different embodiment there is disclosed a method for working or processing at least one component or workpiece using autogenous processes, characterized in that at least one flame issuing from the burner head or nozzle in the direction of the component or workpiece is enclosed by at least one enveloping gas, and that the concentration of contaminants contained in the waste gas is reduced by the enveloping gas.

This enveloping gas device may be used to transport at least one enveloping gas in such manner that this enveloping gas at envelops at least one flame issuing from the burner (head) or nozzle and directed at the component or workpiece like at least one gas curtain. It is particularly advantageous if the flame is enveloped entirely, so that the contaminant concentration, particularly the concentration of nitrogen oxides ($NO_X$) is reduced.

According to a particularly advantageous improvement of the present invention, the end area of the enveloping gas device facing the component or workpiece protrudes slightly beyond the end area of the burner head or nozzle that faces the component or workpiece. This enables particularly strong and stable isolation of the flame and effectively prevents contaminants contained in the waste gas, particularly nitrogen oxides ($NO_X$), from forming.

Accordingly, the enveloping gas may be used to reduce the concentration of contaminants contained in the waste gas of the device, particularly the concentration of nitrogen oxides ($NO_X$), such as toxic nitric oxide (NO) and/or nitrogen dioxide ($NO_2$) as well as other undesirable compounds by isolating the flame with the enveloping gas, and thereby largely or completely preventing the atmosphere from reaching the flame. In this respect, the present invention enables contamination to be minimized, which in turn is beneficial both for the health of the burner operator and for compliance with limit values.

The enveloping gas or curtain gas (in the sense of a gas that creates a curtain) that is transported in the cavity between the outer wall of the burner (head) or nozzle and the inner wall of the enveloping gas device may advantageously be at least one gas or at least one mixture of gases from the group of argon, helium, carbon dioxide, oxygen, nitrogen and hydrogen or mixtures thereof. It may also be advantageous if a gas mixture that normally serves as a forming gas or a gas for shielded arc welding is used. Other inert gases, for example neon, are also possible.

Shielding of the flame that exits the burner (head) or nozzle in the direction of the component or workpiece by the gas curtain created in the form of the enveloping gas also enables the flame to act on the component or workpiece in more concentrated fashion. In this way, the flame is concentrated by the enveloping gas device, which may also be referred to as an enveloping flow device.

In this way, the enveloping gas may be serve to accelerate the transfer or release of heat to the component or workpiece, thereby optimizing the use of the burner by concentrating the flame by means of the enveloping gas and preventing interactions between the flame and the atmosphere.

Such an improvement in the heat transfer thus results in shorter working times, which means that the process time for autogenous processes may be reduced according to the invention. The improved heat transfer increases the process speed of the autogenous process by at least a third, preferably by at least half. Consequently, manufacturing times, for example for constructing pipelines, in shipbuilding or steel construction, are shortened and product throughput is faster.

Several different advantageous embodiments are possible for the enveloping gas device. The common feature of such embodiments is that the enveloping gas may be transported particularly between the outside of the burner and the inside of the enveloping gas device in such manner that the flame of the burner gas (mixture) is enclosed as completely as possible by the gas curtain formed by the enveloping gas.

The physical shape of the enveloping gas device in each case also depends on the importance of enveloping the flame. For example, in order to ensure a particularly effective and stable enclosure of the flame, it is particularly helpful to use an enveloping as device having the shape of a closed hollow cylinder. At the same time, it is particularly advantageous to pass a hollow cylinder or tube over the burner or at least over the burner head or the nozzle.

In another advantageous embodiment, the enveloping gas device may also be a ring that surrounds the burner of the flame and from which the enveloping gas flows to form the gas curtain.

In a preferred embodiment, one or more additional enveloping gas device(s), particularly a second enveloping gas device may be used, in which case the first enveloping gas device and the second enveloping gas device are advantageously arranged concentrically. A second enveloping gas device of such kind is particularly beneficial if work is being carried out with different types of enveloping gases and/or with different flow speeds of the respective enveloping gases, and consequently more than one gas curtain is being used, for example in order to achieve a particularly high degree of isolation of the flame.

The enveloping gas device is arranged in such manner relative to the burner head or nozzle that the centre line of the enveloping gas device is essentially congruent with the axis of symmetry (A) of the burner head or the nozzle.

It is particularly advantageous if an enveloping gas device is allocated for single flame or single nozzle burners, an enveloping gas device is allocated to the burner head nozzle in the case of a flame burner in which many small individual flames combine to form one flame escaping from the burner head or nozzle, one enveloping gas device each is allocated to each of the multiple nozzles in the case of a multinozzle burner, particularly a multinozzle directed flow burner, and an enveloping gas device is allocated to the burner head or nozzle in the case of a special burner.

Finally, the present invention relates to the use of at least one enveloping gas device of the kind described in the preceding text and/or at least one device of the kind described in the preceding text in oxyfuel technology, for example for working or processing a component or workpiece by flame straightening, by flame cutting, by flame heating, by brazing or by flame gouging.

DETAILED DESCRIPTION OF THE INVENTION

Figure 1:
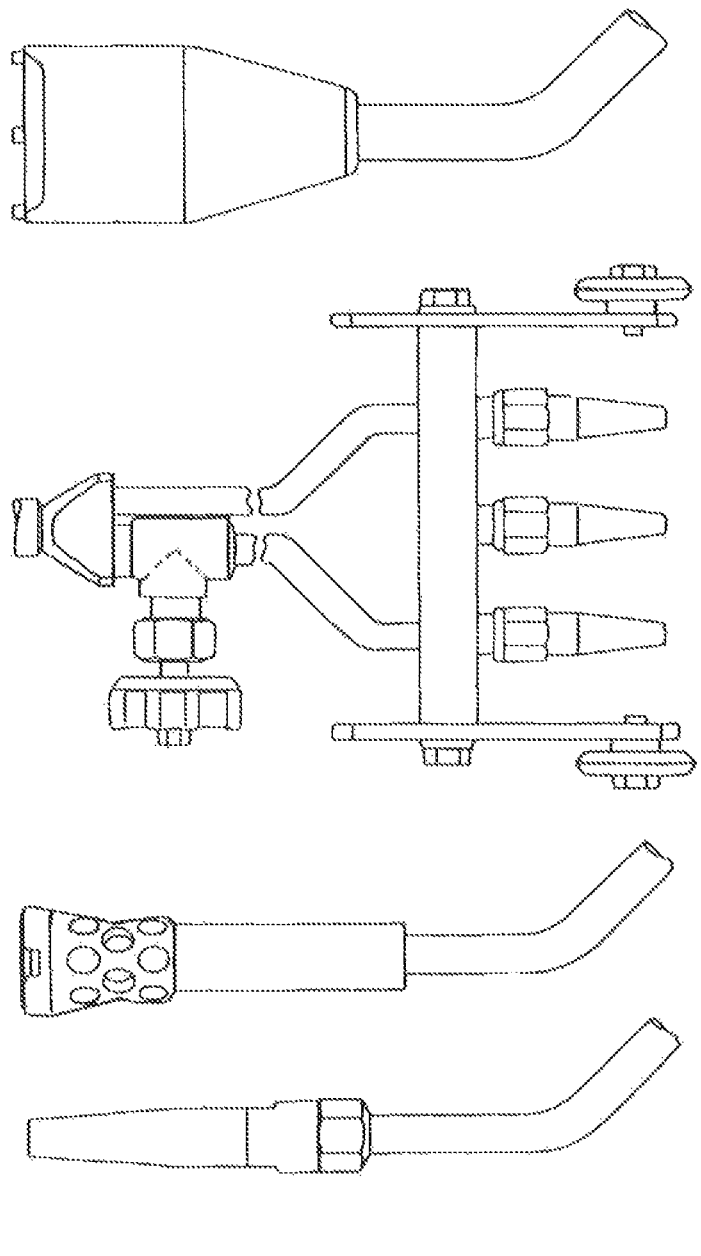
FIG. 1 is a schematic representation of various embodiments of conventional flame devices in the form of a single flame or single nozzle burner, a flame burner, a switchable three-nozzle burner and a special burner.
Figure 2:
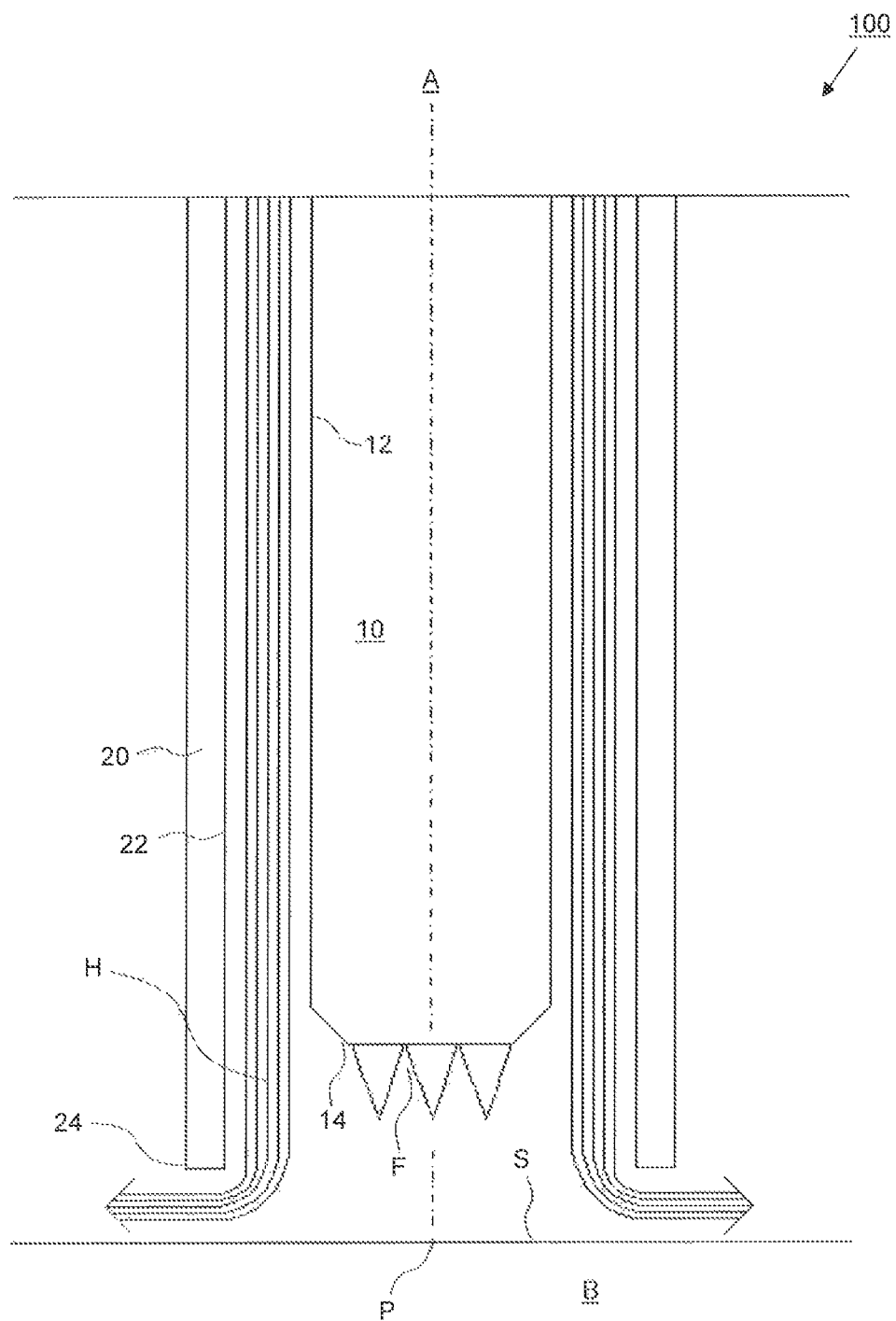
FIG. 2 is a schematic representation of an embodiment of a device according to the present invention, which includes an enveloping gas device as described in the present invention and functions in accordance with the method described in the present invention.

FIG. 2 shows an embodiment of a flame burner of a device intended for oxyfuel processes, that is to say a flame burner 100 according to the present invention.

The type of arrangement of a burner head 10 as illustrated in FIG. 2 enables flame burner 100 to be put to use cheaply and effectively in the desired autogenous flame process.

Flame burner 100 as shown in FIG. 2 features a hollow cylindrical or annular enveloping gas device 20 that is designed to transport an enveloping gas H between the outer wall 12 of burner head 10 and the inner wall 22 of enveloping gas device 20. This enveloping gas H may be used in the manner of a gas curtain to enclose the acetylene-oxygen flame F that is discharged at gas outlet location 14 in the direction of component B, so that flame F may act in more concentrated fashion on application site P located on the surface of component B.

The exemplary illustration in FIG. 2 further shows that the end area 24 of enveloping gas device 20 that is facing component B protrudes slightly beyond gas outlet location 14 to provide particularly effective and stable isolation of flame F and thus prevent formation of contaminants contained in the waste gas, particularly formation of nitrogen oxides ($NO_x$).

However this is not an obligatory feature of the present invention, being dependent on the nature and purpose of the flaming process. For example, enveloping gas device 20 may also be approximately the same length as burner head 10, or the enveloping gas device may even be shorter than burner head 10.

For purposes of the greatest possible symmetry of arrangement 100 according to FIG. 2, enveloping gas device 20 is arranged in such manner with respect to burner head 10 that the axis of symmetry of enveloping gas device 20 is congruent with the axis of symmetry A of burner head 10.

In an exemplary embodiment of a single flame/single nozzle burner, or also of a multi-nozzle burner, a nozzle from which a flame F escapes is arranged in flame burner 100 instead of burner head 10.

The power output of the fuel gas is critically important to the success of the autogenous process. The very high temperature of acetylene-oxygen flame F together with a high thermal output of acetylene-oxygen flame F provides the maximum effect, which is reflected in exceptional economy and efficiency.

The advantages of the present invention are realized for all fuel gases. Certain fuel gases are cited in the EN ISO 5172 standard, for example, though that list is not exhaustive. Compressed air may also be used as the combustion partner instead of oxygen. In turn, the size of the burner must be selected with consideration for the nature of active agent B and/or the thickness of workpiece B.

The advantages described, which particularly include a significant reduction in the concentration of contaminants in the waste gas from the burner, and a correspondingly minimized threat to the health of the burner operator, while retaining an advantageous flame shape and thus significantly improved heat transfer and perceptibly faster process speed of the autogenous process are particularly pronounced in the present invention when its use is combined with suitable enveloping gases, such as argon, helium, carbon dioxide, oxygen, nitrogen and hydrogen and mixtures thereof, as well as special mixtures that are known as forming gases or gases for shielded arc welding.

LEGEND

100 Device provided for working or processing component or material or workpiece B using autogenous processes, particularly flame burners
10 Burner head or nozzle
12 Outside or outer wall of burner head or nozzle 10
14 End or end area of burner head or nozzle 10, particularly gas outlet location
20 Enveloping gas device or enveloping flow device
22 Inside or inner wall of enveloping gas device 20
24 End or end area of enveloping gas device 20
A Axis of symmetry of burner head or nozzle 10
B Component or material or workpiece
F Flame
H Enveloping gas or curtain gas
P Application site, particularly the location at which flame F meets component or material or workpiece B
S Surface of component or material or workpiece B

Having thus described the invention, what I claim is:

1. An enveloping gas device for transporting at least one enveloping gas, wherein the enveloping gas device is allocated to a burner head or at least one nozzle of a device provided for working or processing at least one component or workpiece by autogenous processes selected from the group consisting of autogenous flame cutting, autogenous flame brazing, and autogenous flame gouging, characterized in that at least one burner flame issuing from the burner head or nozzle and directed towards the component or workpiece is completely enclosed by the enveloping gas which is not consumed by the at last one burner flame, and concentrating the flame on the at least one component or workpiece and the concentration of contaminants contained in the waste gas from the device is reduced by the enveloping gas, wherein an end area of the enveloping gas device facing the component or workpiece protrudes slightly beyond end area of the burner head or the nozzle that faces the component or workpiece.

2. The enveloping gas device as claimed in claim 1, characterized in that the enveloping gas transported in the cavity between the outer wall of the burner head or nozzle and the inner wall of the enveloping gas device is at least one gas or gas mixture selected from the group consisting of argon, helium, carbon dioxide, oxygen, nitrogen and hydrogen.

3. The enveloping gas device as claimed in claim 1, characterized in that the enveloping gas device is in the shape of a hollow cylinder.

4. The enveloping gas device as claimed in claim 1, characterized in that the enveloping gas device is arranged in such manner relative to the burner head or nozzle that the centre line of the enveloping gas device is essentially congruent with the axis of symmetry (A) of the burner head or the nozzle.

5. The enveloping gas device as claimed in claim 1, characterized by a configuration selected from the group consisting of as a single flame or single nozzle burner, in which one enveloping gas device is allocated to the nozzle, as a flame burner, in which many small individual flames form one flame that issues from the burner head, and in which one enveloping gas device is allocated to the burner head, as a multi-nozzle burner, in which one enveloping gas device is allocated to each nozzle, and as a special burner, in which one enveloping gas device is allocated to the burner head.

6. A method for working or processing at least one component or workpiece using autogenous processes selected from the group consisting of autogenous flame cutting, autogenous flame brazing, and autogenous flame gouging, characterized in that at least one flame issuing from the burner head or nozzle in the direction of the component or workpiece is enclosed by at least one enveloping gas, and that the concentration of contaminants contained in the waste gas is reduced by the enveloping gas.

7. The method as claimed in claim 6 wherein the contaminants are nitrogen oxides.

* * * * *